United States Patent [19]

Duerig et al.

[11] Patent Number: 5,793,743
[45] Date of Patent: Aug. 11, 1998

[54] READING A MAGNETIC STORAGE MEDIUM WITH A PROBE THAT DETECTS TUNNELING CURRENT INDUCED IN A MAGNETIC LAYER BY A NON-IONIZING LIGHT BEAM

[75] Inventors: Urs Th. Duerig, Rüschlikon; Rolf Allenspach, Adliswil; Peter Gruetter, Basel, all of Switzerland

[73] Assignee: International Business Machines Corporation, Armonk, N.Y.

[21] Appl. No.: 635,944

[22] PCT Filed: Nov. 3, 1993

[86] PCT No.: PCT/EP93/03079

§ 371 Date: May 2, 1996

§ 102(e) Date: May 2, 1996

[87] PCT Pub. No.: WO95/12882

PCT Pub. Date: May 11, 1995

[51] Int. Cl.⁶ .................................................. G11B 7/00
[52] U.S. Cl. ........................ 369/126; 369/13; 250/306
[58] Field of Search ........................ 369/126, 13, 121; 250/306, 227.26, 307; 365/145, 117, 176; 324/260, 212

[56] References Cited

U.S. PATENT DOCUMENTS

| | | | |
|---|---|---|---|
| 4,985,627 | 1/1991 | Gutierrez et al. | 250/306 |
| 4,992,659 | 2/1991 | Abraham et al. | 250/306 |
| 5,264,794 | 11/1993 | Burke et al. | 324/200 |
| 5,288,997 | 2/1994 | Betzig et al. | 250/227.26 |
| 5,294,790 | 3/1994 | Ohta et al. | 250/306 |
| 5,325,342 | 6/1994 | Vo-Dinh | 369/13 |
| 5,453,970 | 9/1995 | Rust et al. | 369/101 |
| 5,481,527 | 1/1996 | Kasanuki et al. | 369/126 |

FOREIGN PATENT DOCUMENTS

| | | |
|---|---|---|
| 0 355 241 A1 | 2/1990 | European Pat. Off. . |
| 355241 | 2/1990 | European Pat. Off. . |

*Primary Examiner*—Tod R. Swann
*Assistant Examiner*—Kim-Kwok Chu
*Attorney, Agent, or Firm*—Ronald L. Drumheller

[57] ABSTRACT

An apparatus and a method for retrieving data stored on a magnetic medium with a high resolution is described. It is characterized by measuring a tunneling current which is partly depending on the magnetization of the medium (1). This dependence is caused by irradiating the medium (1) with polarized non-ionizing light. The tunneling current can be measured with a high lateral resolution by applying a probing tip (2) as known from conventional scanning tunneling microscopy or related techniques.

14 Claims, 4 Drawing Sheets

READING A MAGNETIC STORAGE MEDIUM WITH A PROBE THAT DETECTS TUNNELING CURRENT INDUCED IN A MAGNETIC LAYER BY A NON-IONIZING LIGHT BEAM

The invention relates to a method and to an apparatus for retrieving digital data from a magnetic storage medium by applying polarized electromagnetic radiation.

BACKGROUND OF THE INVENTION

In present-day data processing, the storage of information is a key issue. Although the speed of processing the data has increased tremendously over the last decade, there is a demand for the ability to process ever larger volumes of data. The handling of large volumes of data, however, faces two related problems. The first problem is one of size: The storage facility for a large volume of data is big of necessity, and immediately this brings about the second problem, which is one of speed. The bigger the storage, the longer it takes to address the location where th e desired information sits, and the longer become the paths the information has to travel from its storage location to a processing station. Obviously, storage design must strive at shrinking memory space as much as possible, in other words, aim at increasing storage density.

The invention is aimed at improving the resolution of the detection of magnetic domains having different directions of magnetization. Thus, it concerns all magnetic recording technologies, the most important of which will be discussed in more detail.

The predominant technology of magnetic recording devices appears in form of magnetic hard disks, floppy disks, and magnetic tapes. In the basic process of magnetic recording, a magnetic write head and the storage medium (disk or tape) are in relative motion with respect to each other. The write head creates a magnetic field which emanates from a gap within the head and magnetizes a small region of the medium. The relative motion separates in space the write signals being sequential in time. The recorded information can be recovered by a read head, which is usually, but not necessarily, identical with the write head. For example, dual-element heads exist, utilizing inductive elements for writing and magneto-resistive sensors for reading.

Magnetic storage media can be divided into materials allowing either a direction of magnetization longitudinal to the surface or perpendicular to it. Perpendicular recording media are known for a, at least theoretical, great potential of ultrahigh density recording, whereas longitudinal recording media represent the type of material mostly used in current applications. Both types of material are within the scope of the present invention.

State-of-art resolution in magnetic recording is demonstrated, for example, by T. Yogi et al. in the IEEE Transactions on Magnetics, Vol. 26, No. 5Sep. 1990, pp. 2271–2276, using a longitudinal magnetic storage me combination with a dual-element and achieving a storage density of roughly 0.2 Gbit/cm$^2$. The linear density corresponds to approximately 80 000 per cm. Very high storage densities have also been achieved with magneto-optic techniques. The writing of bits of information applying these techniques is performed by heating tiny spots of the storage medium with a well-focused high-intensity laser beam to temperatures above the Curie (or compensation) temperature $T_C$ of the material used for the storage medium, in the presence of a magnetic field. At the Curie temperature, the material loses its spontaneous or previous remanent magnetization, and its magnetization can assume the direction of an external field, which they retain after the laser beam, i.e. the source of heat, was turned off.

In known magneto-optic storage devices, the information is read by shining a low-intensity laser beam onto the addressed storage location and analyzing the rotation of the polarization of the reflected light induced by the magneto-optic Kerr effect. (Kerr effect is the name for the change of the polarization of an incident light beam upon reflection at a magnetic material proportional to the magnetization.)

U.S. Pat. No. 4,823,220 describes a detector for detecting the p- and s-components of the light reflected by the magneto-optic storage medium, wherein the p- and s-components are converted from polarization rotations into a single combined-intensity modulated beam which is then intensity-modulation detected for indicating the information content of the beam. In doing so, first either the p- or s-component is rotated to the s-- or p-polarization plane, respectively, then the rotated and other light are processed using interferometric techniques to obtain either light or dark, which is intensity-modulated.

An interferometer particularly adapted to detect light received from a magneto-optic storage medium, i.e. reflected light which has rotated polarization caused by said storage medium, is also known from U.S. Pat. No. 4,823,220. It may include a polarization beam-splitting prism having a first face for receiving the reflected light from the medium, comprising p- and s-polarization components, and for directing these components on first and second perpendicular light paths. The first path carries the one component in a first minimal delay, the second path carries the second component in a second, equal or greater delay. The light paths are then combined for creating an interference pattern from which the optical relationship between said first and second components can be determined and converted into a modulated electrical signal carrying a representation of the stored information.

In conventional magneto-optic storage devices, the ability to provide high-density recording on optical disks requires high laser power which is available only at comparatively long wavelengths, approximately 800 nm. To increase the recording speed, one uses 40 mW laser diodes which turn out, however, to have a limited life cycle. Semiconductor laser devices have been developed which produce shorter wavelengths, though with low efficiency, such that at 400 nm the incident power will be less than 1 mW. The shorter wavelength means, however, that the bit diameter can be cut in half, thereby increasing the density by four times.

The techniques of magneto-optic recording reported in the prior art are capable of writing domains with diameters well below the wavelength λ (at present <200 nm) since the laser intensity can be chosen such that only the central part of the Gaussian beam profile locally heats the recording medium above its Curie or compensation temperature $T_C$ and, hence, allows switching of magnetic domains. This technique is really very efficient since a small change in laser intensity produces a small change in temperature, which — in the neighborhood of $T_C$—is sufficient to produce a large change in the magnetic anisotropy, and this determines the domain switching characteristics.

Another method to write data on a magneto-optic disc with a domain size in the 70–300 nm range is proposed, for example, in D. Rugar et al., IEEE Transactions on Magnetics, Vol. Mag-24, No. 5, September 1987, pp. 2263-

2265. Laser spots which have a defraction-limited size in itself are placed in an overlapping mode. Thus, a laser spot partially erases the domain set by the previous spot leaving a crescent shaped domain with reduced size. By using developed coding schemes for the stored date, it is further possible to use the transition area between two domains as information carrier instead of the magnetization of the domains themselves.

Scanning methods for recording and retrieving magnetic domains utilizing the optical near-field are also known. European patent application EP-A-0 437 170 discloses a way of detecting individual storage locations by coupling a laser beam through a wave guide arranged in juxtaposition with the storage medium into the magnetic layer. The light transmitted through said layer is analyzed by a scanning tapered optical fiber brought close to the magnetic layer. A slight modification of this method is published by Betzig et al. in Appl. Phys. Lett. 61(2), 13. Jul., 1992, pp. 142–144, applying a near-field scanning optical microscope to write domains down to a size of 60 nm. Laser light is coupled into a tapered optical fiber, which is scanned over the magnetic medium in close proximity (10 nm) to heat up the medium above the Curie temperature. The size of the near-field is no longer diffraction-limited, but determined by the geometry of the tip and the tip-medium distance.

Even though the previously cited optical near-field method can in principle also be adopted to retrieve data from a magnetic medium, the mostly applied prior art systems for the optical read-out of data, however, are limited in resolution by the wavelength $\lambda$ and the numerical aperture of the used objective, as the detection is based on the Kerr effect in the normal far-field of the light. Applying laser diodes emitting light of 600 nm wavelength, a spot size of 600 nm can be achieved, assuming a numerical aperture of 0.5.

An alternative to the Kerr effect has been proposed by Schütz et al. in Phys. Rev. Lett. 58, 1987, p. 737. In contrast to the Kerr effect, which involves visible light and electronic transitions from the valence band to the conduction band, the described method uses circularly polarized x-rays as a probe for magnetism. The so-called magnetic circular x-ray dichroism (MCXD) technique measures the difference in absorption between right and left circularly polarized x-rays at an inner shell absorption edge in the magnetic materials.

Based on this technique, the images of magnetic bits on a CoPtCr magnetic recording disk have been retrieved, as shown by J. Stöhr et al. in Science, Vol. 259, January 1993, pp. 658–661, using circularly polarized soft x-rays with energies near the Co $L_3$ (778 eV) and/or $L_2$ (793 eV) edges, and by detection and imaging of emitted electrons from the sample with a photoemission microscope. Magnetic circular dichroism (MCD) has also been investigated using synchrotron radiation in the range from 7 eV to 31 eV.

Yet another approach to scan magnetic domains of a sample is known from assignee's U.S. Pat. No. 4,992,659. The tip of a scanning tunneling microscope is subjected to one or two a.c. voltage(s) causing a vibratory motion of the tip relative to the sample. The motion of the tip is influenced by the Lorentz force due to the magnetic field distribution of the sample. The induced derivation is detected and measured using an optical heterodyned interferometer comprising a probing laser and a lens system. Resolutions of better than 0.5 nm are provided.

It is an object of the present invention to improve the read-out of magnetic or magneto-optic storage devices. The invention is particularly aimed at improving the resolution of commonly used read heads, or, in cases where an apparatus with a higher resolution is already applied, to enhance its applicability. More specifically, it is a purpose of the present invention to propose a method and a device using MCD for the detection of domains on a magnetic storage medium with high spatial resolution. Furthermore, it is an object of the invention to avoid the use of x-ray and/or synchrotron radiation to detect the effects of MCD.

SUMMARY OF THE INVENTION

The aforementioned objects of the invention are achieved by a read-out device comprising a probing tip, which can be positioned in proximity to the magnetic layer of the storage medium. The geometry of the tip, i.e., its tapered end and the distance between medium and tip basically define the resolution at which the magnetic domains on the storage medium can be detected. The new apparatus further comprises two conductive layers, one of which can be the magnetic layer, and means to hold said conductive layers at different potentials. Thus, by applying a voltage between both conductive layers, it is possible to induce a current, provided the insulating layer between both conducting layers is sufficiently thin. Within the scope of this invention, the two conductive layers are denoted as electrodes. In view of the use of non-ionizing radiation and the narrow gap between both electrodes,as will be described below, the electrical current flowing through both both electrodes is defined as tunneling current.

To use this tunneling current to detect domains of different magnetization, it is necessary to modulate the current by polarized electromagnetic radiation, preferably having a wavelength between 0.4 and 2.0 µm. The energy transmitted by said radiation is non-ionizing, i.e. lies below the work function of the illuminated material. Thus, no photoemission of electrons occurs. Electrons are instead excited to higher levels or energy bands within the material, from which tunneling is more likely than from their ground states.

The polarized electromagnetic radiation excites electrons having opposite spin orientations with different probabilities. As excited electrons generally have a higher probability for tunneling, the detected tunneling current provides a measure of the spin orientation of the electrons, i.e., the magnetization, within a domain of the magnetic material. By tuning the (tunneling) voltage to an energy which equals difference in the maxima in the state density of electrons having opposite spin orientations, it is possible to selectively enhance the tunneling current. Another method to optimize the new device with regard to the photon energy of the polarized electromagnetic radiation is described below.

The invention is applicable to storage media with longitudinal direction of magnetization as well as to media with perpendicular direction of magnetization. The hazardous high energy x-ray radiation applied in known MCD techniques is replaced by light radiation with a linear or an elliptical polarization.

The new device can resolve magnetic domains with a size of less than 1 µm and, considering the advances in other microprobing techniques, such as scanning tunneling microscopy (STM), atomic force microscopy (AFM), and scanning near-field optical microscopy (SNOM), resolutions of about 10 nm are anticipated. Among the parameters which dominate the resolution of the read-out device, the size of the tip and the distance between tip and surface (of the medium) are the most important.

While it is possible to produce simple tips with single atoms at the apex, as demonstrated, for example, by H.-W. Fink in IBM J. Res. Develop. Vol. 30, No. 5 September 1986, pp. 460–465, it is yet difficult to produce more complex tips, e.g., tips having a central wave guide. Using the method described, for example, in U.S. Pat. No. 5,138,159, tapered quartz fibers with a radius of curvature of about 10 nm at the tip portion can be prepared.

Another method for preparing an optical fiber as probing tip is described in the European patent application EP-A-0 487 233. To control the tip-surface distance within the required nm range, either the whole storage system comprising magnetic medium and read-out device has to be manufactured with hitherto unachieved tolerances, or a positioning device is connected to the tip employing feedback control schemes known per se by the above-mentioned microprobing techniques (STM, AFM, SNOM, etc.). The feedback loop measures a distance sensitive signal, such as the tunneling current, the force acting on the tip, or the intensity of the evanescent light emitted from the surface. From this signal the control parameters for the, usually piezoelectric, actuator which moves the tip are derived. The related techniques are well developed and do not form a particular element of the current invention.

The polarization mode of the applied electromagnetic radiation is arbitrary. Linearly or elliptically polarized light can be used, however, bests results have been so far achieved with circularly polarized light. To derive a well defined polarization mode, filters and $\lambda/4$-plates can be utilized. The radiation is directed to the first electrode by means comprising a lens or a wave guide (optical fiber). The radiation is focussed onto the surface of the magnetic layer by means of an optical fiber or a lens.

As a light source, any means able to emit intense radiation is suitable for the purpose of this invention. The use of a monochromatic radiation delivering a well-defined photon energy is preferred but not required within the context of the current invention. Lasers, in particular laser diodes, combine high radiation intensities and monochromaticity together with a, at least partial, polarization and form therefore the most preferred sources of radiation. Commercially available laser diodes cover a wavelength region from 2 $\lambda$m to 400 $\lambda$m.

To optimize the effect of the irradiation, the photon energy of the applied light is preferably chosen to correspond approximately to the exchange energy separating different spin orientations in the storage medium, e.g., 2.2 eV in Fe, 1.0 eV in Co, or 0.7 eV in Ni. Tuned to this energy, the spin-dependent excitation of the electrons reaches a maximum. The tunneling probability of the excited electrons can be enhanced by adjusting the vacuum work function of the magnetic material also close to this energy. The tunneling probability of the unexcited conduction electrons remains exponentially dependent from the thickness of the insulating layer or gap. Their share in the tunneling current can thus be reduced by increasing this thickness.

The measuring techniques for small currents have evolved with the progress of the aforementioned scanning tunneling microscopy, and the detection of currents in the range of picoamperes imposes no problems on a skilled person. A suitable current-to-voltage (I/V) converter is described, for example, by B. Michel et al. in Ultramicroscopy 42–44 (1992), pp. 1647–1652. The MCD technique modulates the tunneling current in the order of 1 pA to 10pA. This modulation can be, thus, easily detected, especially when using lock-in techniques, e.g. switching the laser radiation with a known frequency. As these techniques are well known, a detailed description of the means for measuring the tunneling current is therefore omitted.

Means for applying a voltage consists usually of a voltage source connected to both electrodes. For specific purposes, contact-free methods, for example charging one electrode by photoemission or through an ion beam, may be advantageously exploited to establish a potential difference between both electrodes.

Suitable for the purpose of this invention are magnetic storage media as being used by other magnetic recording techniques. A selection of magnetic materials and important parameters governing their optimization are known, for instance, from: J. K. Howard, J.Vac.Sci.Techn. A 4(1), January/February 1986, pp. 1–13. In general, a magnetic storage medium should exhibit a high magnetization, high coercivity, and a square hysteresis loop to enable the writing of oppositely magnetized regions with a high density. These and other boundary conditions, such as stability and production costs resulted in the development of a vast variety of possible materials. Therefore, the following materials should only be regarded as examples. The materials are in most cases deposited onto a carrier or substrate made from glass or suitable plastics and covered by a thin protecting layer. Magnetic oxide materials, such as ferrites and garnets, or CoCrPt alloys can be applied for the magnetic layer, and silicon nitride or silicon dioxide for the protective coating. Perpendicular recording storage media may include magnetic transition metal/rare earth compounds, such as $Gd_xCo1-x,Tb_xFe1-x$, FeTbGd, and $Fe_xCo_yTb_z$,.etc. where 0.1<x<0.4; 0.35<y<0.5; and 0.15<z<0.3, or, alternatively cobalt alloys, such as cobalt-platinum or cobalt-palladium. Magnetic and magneto-optical storage media comprise for all practical purposes a substrate to stabilize the magnetic layer.

The exact stoichiometric composition will depend on the desired magnetic and optical characteristics. For the specific purposes of the present invention, it is advantageous to cover the actual magnetic recording layer with at least one layer of a material which, together with the magnetic recording layer, forms a dipole layer. The dipole layer adds to the vacuum work function of the magnetic material, and can thus be used to adjust the vacuum work function in order to optimize the tunneling current, if the tunneling voltage should be kept tuned to the maximum difference in the state density between the electrons of opposite spin orientations, as described above. Suitable materials for the described layer are, for example, Cs or K. The achievable difference in the work functions of the probing tip and the storage material ranges from 0 V to 2.2 V.

As mentioned above, it might be further desirable to adjust the exchange splitting energy of the magnetic material with regard to the photon energy of the radiation source by methods like doping, sputtering, and/or alloying, known as such, for instance, in the field of semiconductor production.

The foregoing and other objects, features and advantages of the invention will be apparent from the following, more particular description of the preferred embodiments of the invention, as illustrated by the accompanying drawings.

DESCRIPTION OF THE DRAWINGS

The invention is described in detail below with reference to the following drawings.

EXAMPLES OF THE INVENTION

Figure 1A:
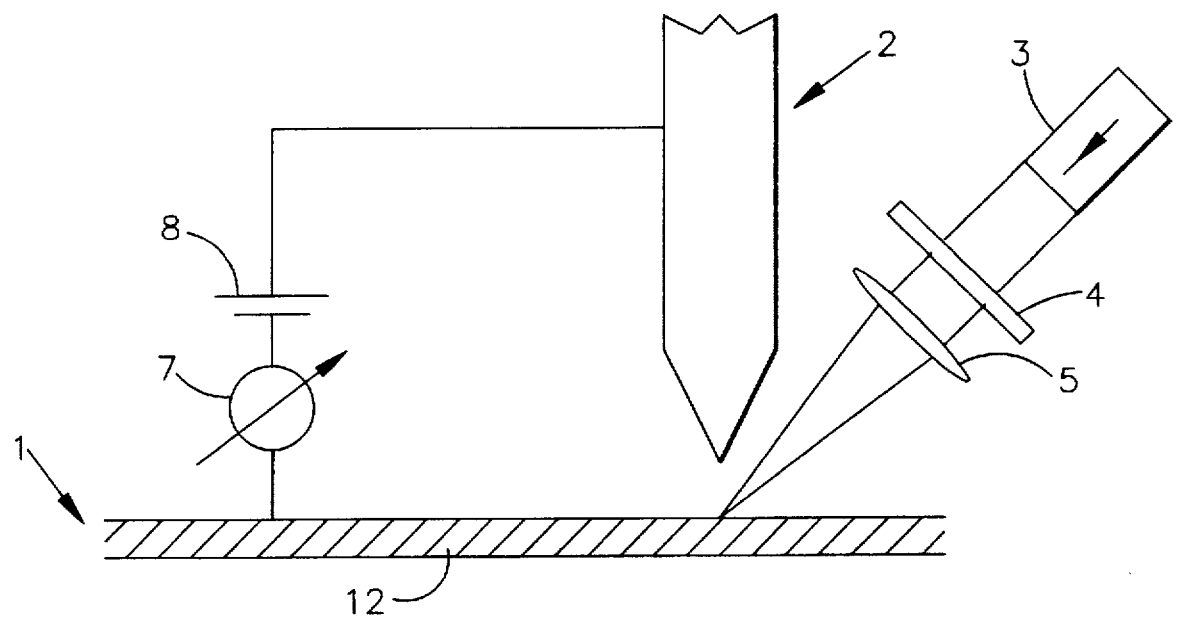
FIG. 1A shows the basic elements of a first preferred embodiment of the invention.

Referring to FIG. 1A, in a first example of the invention, the storage medium 1 comprises a magnetic layer 12 of Co which contains data stored as bits. The bits appear in the magnetic layer as domains of differently orientated magnetization. The magnetic layer 12 forms one electrode of the tunnel junction. The second electrode of the tunnel junction is a tungsten tip 2 sharpened by an etching process using KOH and thus localizing the tunnel current through both electrodes 2, 12 to the area beneath its apex. The tip 2 is positioned in the proximity of the storage medium 1 by piezoelectric actuator means not shown. The gap between tip and surface of the storage medium acts as insulating layer. The tip 2 and the magnetic layer 12 are connected to a circuit comprising a sensitive current detector (I/V-converter) 7 and a voltage source 8 which provides a bias or tunneling voltage $V_t$, which is comparable to the difference in the work functions of the connected materials, which is about 0.1 V in the present example. The storage medium is irradiated by a GaAs laser diode 3 emitting 1 mW power at a wavelength of 780 nm. After generating a circularly polarized light beam by means of a $\lambda/4$ plate 4, the emitted light is guided through a focussing lens 5 producing a spot of approximately 10 $\mu m^2$ on the storage medium. As mentioned above, the resolution of the new device is not determined by the spot size of the laser beam but by the area of the magnetic layer 12 from which a tunneling current is detected. In a device using a tip, this area can be restricted to approximately 500 $nm^2$. In the irradiated part of the magnetic layer 12, electrons are excited and, thus, able to tunnel through the gap. The optical induced tunneling current is measured by the I/V-converter 7. Due to the MCD effect, the tunneling current of about 100 pA is modulated by 1 to 20 percent, enabling the detection of domains with different magnetization.

Figure 1B:
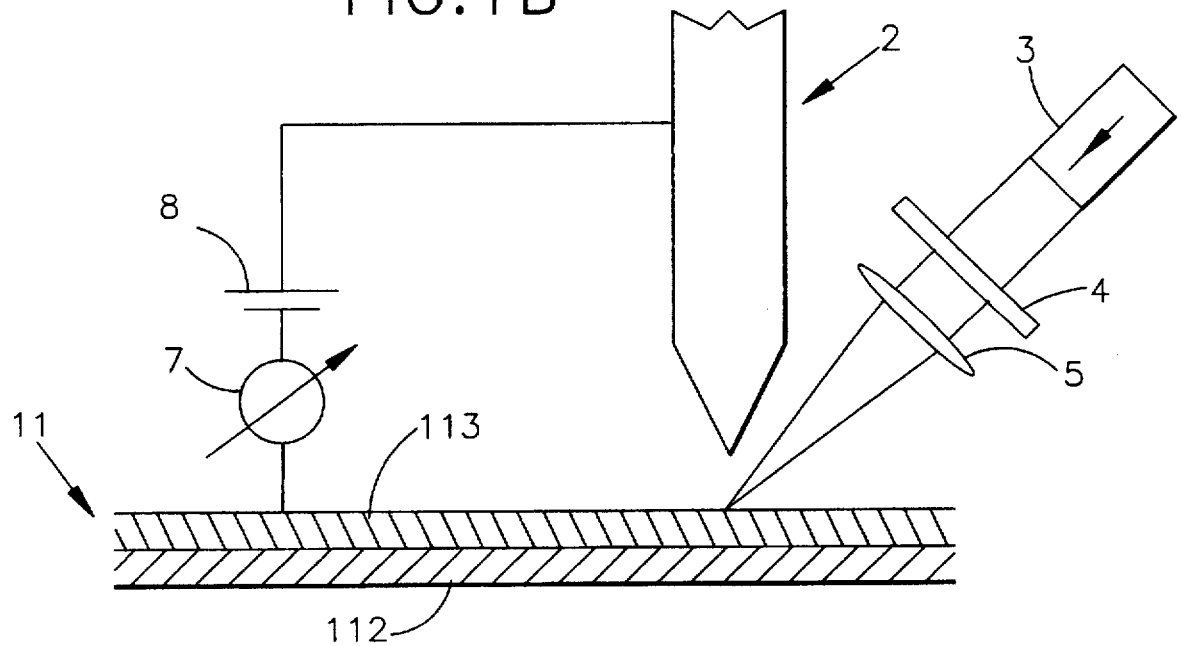
FIG. 1B shows a variant of the embodiment of FIG. 1A.

In a variant of the first example, as shown by FIG. 1B, the storage medium 11 comprises a magnetic layer 112 and a Cs layer 113 to provide a reduction of the vacuum work function, i.e. of the amount of energy required for the electrons to leave a solid. Those elements identical with the ones of FIG. 1A are denoted by equal numerals.

Figure 2:
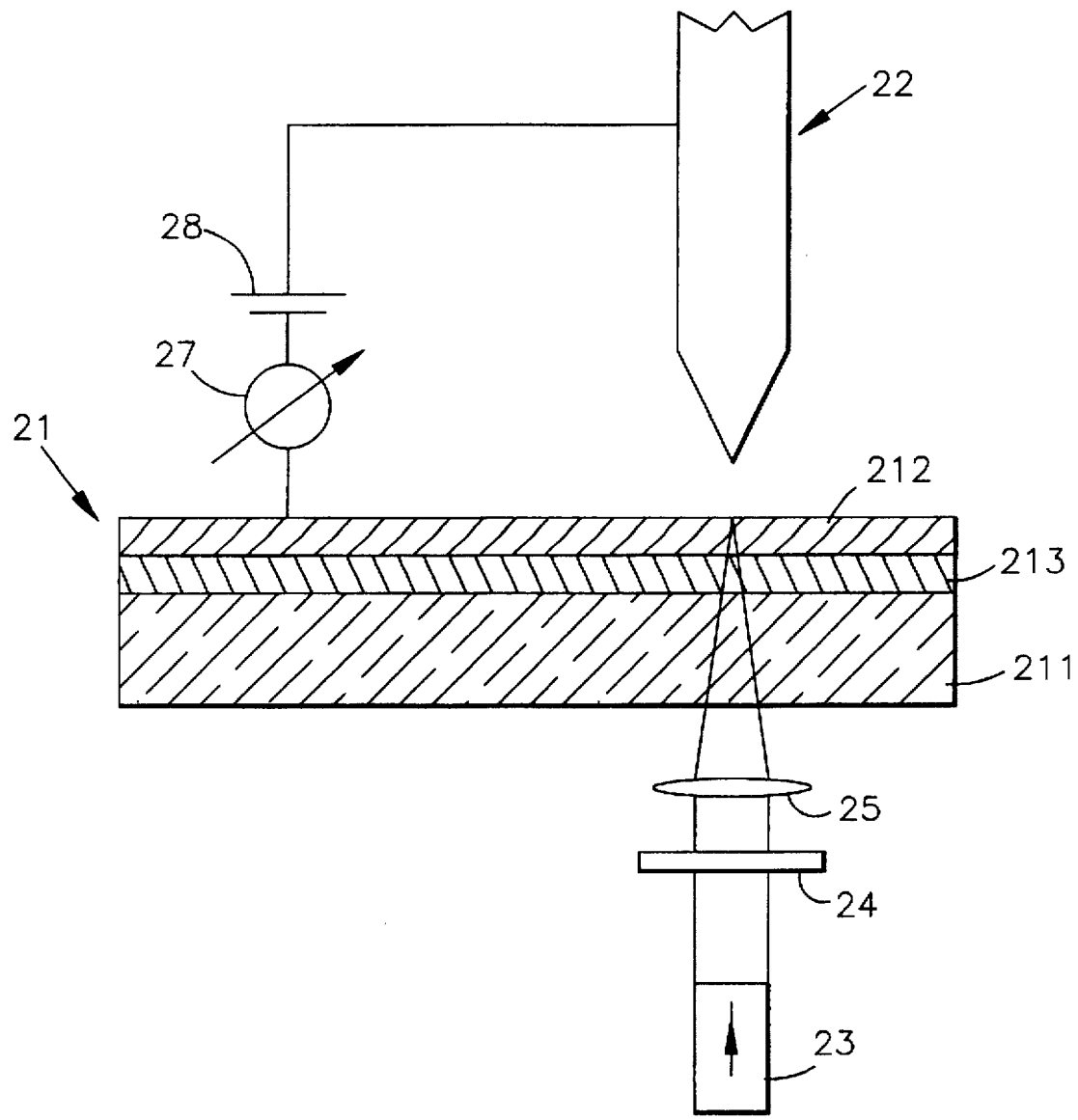
FIG. 2 illustrates another preferred embodiment of the invention (transmission mode).

In a further embodiment of the invention, as illustrated by FIG. 2, the storage medium 21 comprises a magnetic layer 212 of Co deposited on a transparent substrate 211, made of glass, covered with a thin buffer layer 213 of platinum. The use of a transparent substrate 211 allows to irradiate the magnetic layer through the substrate (transmission mode). The used glass substrate 211 might by replaced by suitable plastics. The tunnel junction comprising the tip electrode 22, the magnetic layer 212, itself, and the circuit 27, 28 to determine the tunneling current remain in principle unchanged with regard to the embodiment described above.

In the following examples, the alignment of the read-out device is simplified by guiding polarized electromagnetic radiation through the tip itself. In contrast to the aforementioned methods and devices, the irradiation of the magnetic electrode is narrowed to a spot almost identical to the area from which the tunneling current is detected. The tip is produced from a single mode fiber sharpened by an etch process using hydrofluoric acid. In a subsequent vacuum-deposition step, the conical tip is covered by a platinum layer being almost transparent for the laser beam at its apex. With the conductive Pt layer the otherwise non-conductive fiber is able to serve as tunneling electrode.

Figure 3:
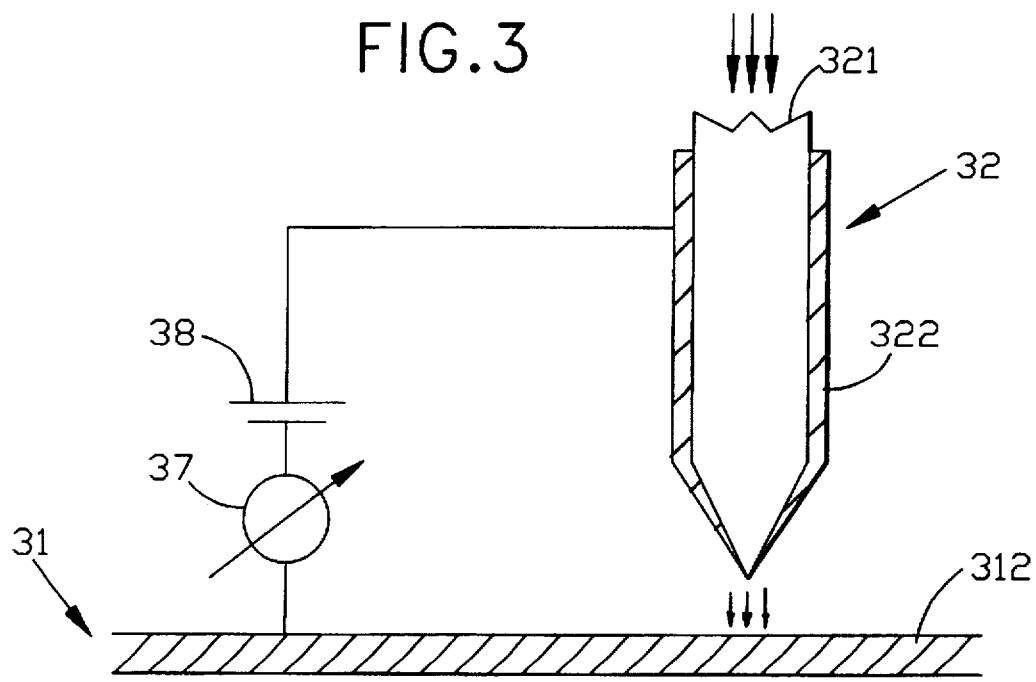
FIG. 3 shows a preferred embodiment with a tip formed as wave guide.
Figure 4:
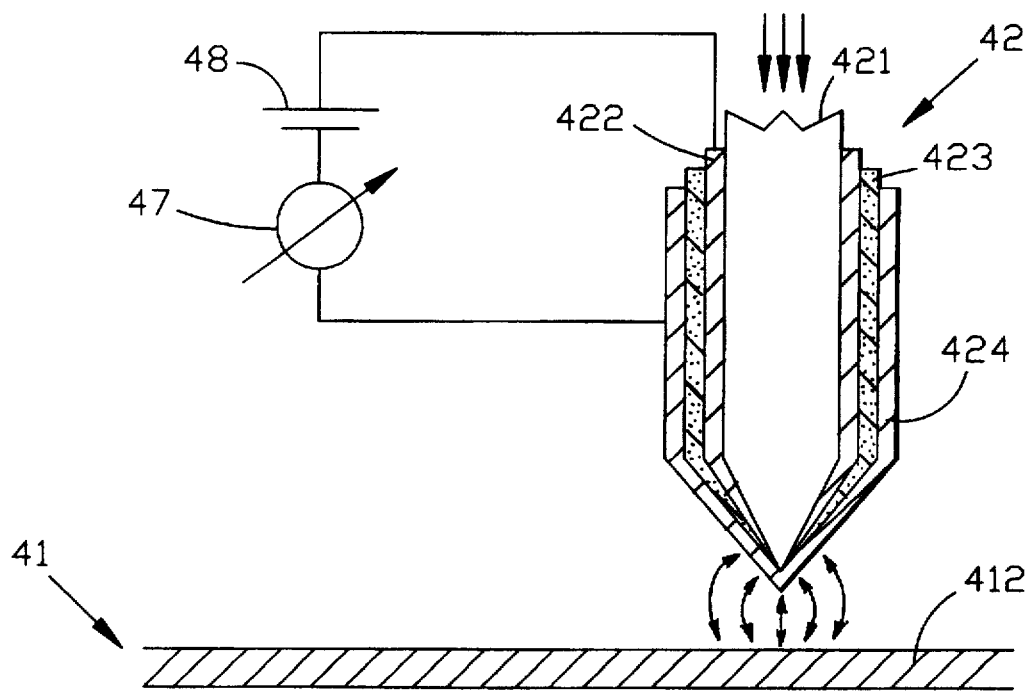
FIG. 4 shows a preferred embodiment with a tunneling junction completely attached to a probing tip.

Referring to FIG. 3, the circularly polarized light guided through the optical fiber 321 is emitted from the apex of the tip 32, giving rise to a tunneling current from the magnetic layer 312 to the platinum cover 322 of the tip. The Pt cover is connected to the voltage source 38 and the I/V-converter 37. At the apex of the tip 32, the Pt layer is sufficiently thinned or removed by means of focussed ion beam milling or the like to let the light pass without any considerable attenuation through an aperture. This aperture preferably has a diameter of less than the wavelength of the applied electromagnetic radiation. In a further embodiment, shown by FIG. 4, the tunneling junction is integrated into the tip 42. The first tunneling electrode formed by a platinum layer 422, as known from the previous example, is followed by a spacer layer 423 made of an insulating material or a semiconductor, like CdS, AlGaAs, or GaP, with a bandgap preferably larger than the photon energy to suppress an electron excitation in the semiconductor. Together with the first metal layer 422 and the following ferromagnetic layer 424, a semiconducting spacer layer 423 forms two Schottky diodes with opposite polarization. The height of the Schottky barrier is 0.5 eV to 1.3 eV for the semiconductors considered in this embodiment of the invention. The spacer layer 423 is 30 to 50 nm thick except at the apex of the tip. In this area the thickness is reduced by means of focussed ion beam milling to 2 nm to 5 nm. The spacer layer is followed by a 2 nm to 5 nm thick layer 424 of permalloy acting as a magnetic head: The magnetization of the storage medium 41 is sensed by a magnetic coupling between the magnetic layer 412 of the medium and the magnetic layer 424 at the apex of the tip. The coupling can be based on magnetostatic effects or on exchange coupling, in which the latter requires a higher degree of accuracy necessary to control the height of the tip above the medium. The tunneling current is now measured between the Pt layer 422 and the ferromagnetic layer 424 by means already described above, however, changed in their arrangement. According to this embodiment, the voltage source 48 and the I/V-converter 47 are connected to the layers 422, 424 of the tip. Thus, a physical connection between the storage medium 41 and the tip 42 is avoided, facilitating a relative motion between both. In operation, the flow of current between the two metal layers 422, 424 of the tip is effectively suppressed by the spacer layer 423, which acts as Schottky barrier. At the apex, however, the spacer layer is sufficiently thin to be traversed by the optically excited electrons, if a sufficient positive bias voltage $V_t$, e.g., 0.2 V to 0.5 V, is applied to the Pt layer. As in the previously described examples, the modulations of the measured current effected by MCD allows to distinguish between domains with different magnetizations on the storage medium.

Figure 5A:
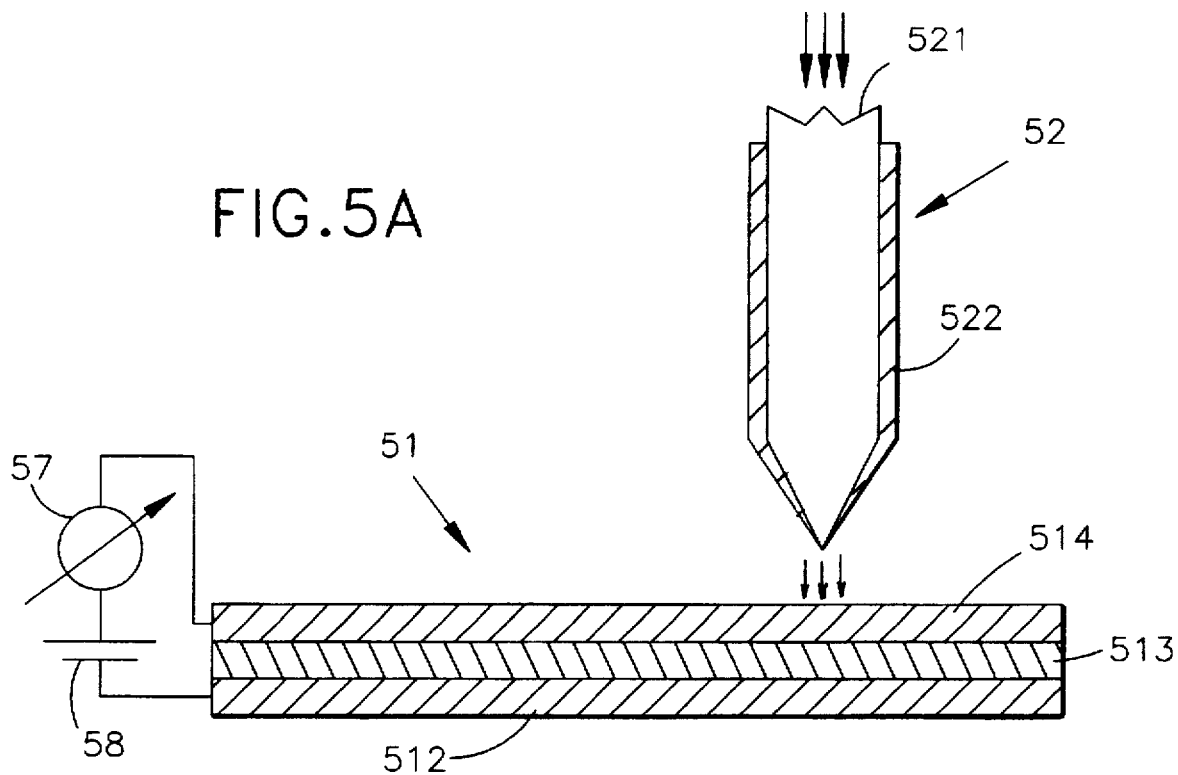
FIG. 5A is a schematic representation of another preferred embodiment having a tunneling junction completely attached to a storage medium.
Figure 5B:
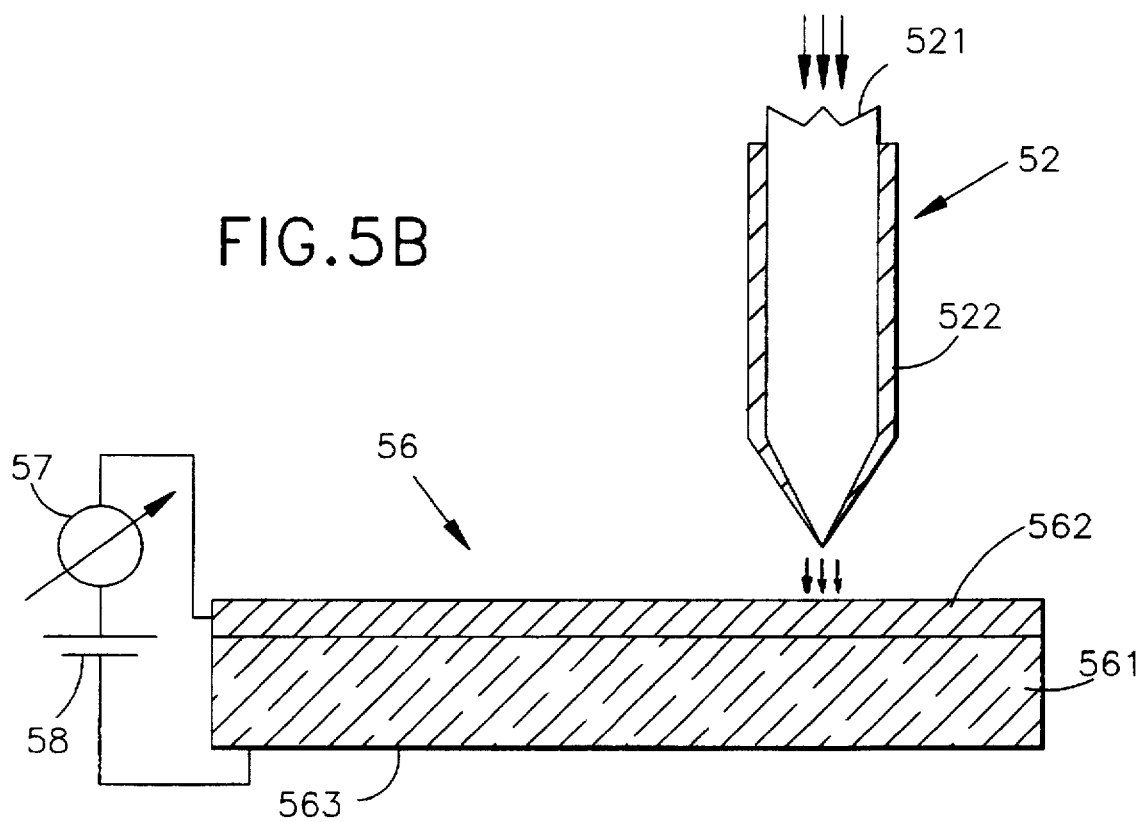
FIG. 5B shows a variant of the embodiment of FIG. 5A.

Further possibilities to avoid an electric connection between the storage medium and the tip are illustrated by FIGS. 5A and 5B. In these embodiments, the tunnel junction is entirely part of the storage medium. In principle, the read-out of stored data is therefore possible without making use of a tip by using a source of polarized electromagnetic radiation combined with focussing devices as illustrated by the first two embodiments (FIGS. 1A,B and 2). A tunneling current is then measured at an area equaling the spot size of the light beam. Hence, the resolution is deteriorated compared to a device comprising a tip but an implementation is made easier. To gain a higher resolution, the size of the irradiated area has to be reduced beyond the diffraction limit. This can be clone by employing optical near-field methods, characterized by positioning a small aperture with a diameter of 10 to 50 nm in a close proximity to the surface of the storage medium.

Referring now to FIG. 5A, the magnetic layer 512 carrying the stored information is covered by a spacer layer 513 and a thin, optically transparent conductor layer 514. Both conducting layers 512, 514 are connected by a circuit comprising a voltage source 58 and an I/V-converter 57 to register the tunneling current which is generated by the evanescent light emitted by the small aperture forming the apex of the tip 52. As in previous examples, the tip itself comprises a cladded optical fiber 521. However, it is not required to use a metal as cladding layer 522, as the cladding layer in this embodiment does not form part of the tunnel junction.

To improve the efficiency of the irradiation, the sequence of the layers in the storage medium 56 can be changed, as demonstrated in FIG. 5B, by positioning the magnetic layer 562 on top of the whole storage medium and reducing layer 563 to a mere contact electrode, which gathers the electrons traversing the layer 561. As layer 561, again, an insulating or semiconducting material may be chosen which efficiently suppresses a current flow emerging from the magnetic layer 562 and not caused by the irradiation. For an efficient tunneling, the magnetic layer thickness is reduced in this embodiment to approximately 5nm, preventing an inelastic scattering of excited electrons within the magnetic layer. Suitable materials for the layer 561 are n-type semiconductors with a large band gap, e.g. CdS, GaP, or AlGaAs.

It should be understood that the scope of the invention is not restricted to the given examples. For various purposes, it might proof necessary to add more features to a device according to the invention, such as a protective layer against wear, friction, and decomposition. However, these features are considered to be well within the scope of a skilled person, and are therefore not referred to, distinctly.

We claim:

1. Apparatus for reading data from a magnetic data storage medium in which data has been stored in magnetic domains of magnetization of two different orientations representing said data, comprising a first electrode and a second electrode including a layer of magnetic material, said layer of magnetic material either being said magnetic data storage medium or being magnetically coupled to said magnetic data storage medium, means for applying a voltage between said electrodes, means for detecting a tunneling current between said electrodes, and means for irradiating said second electrode with non-ionizing light radiation, said light radiation causing, in operation, tunneling current between said electrodes of a magnitude which depends on the magnetization orientation of individual magnetic domains of said magnetic data storage medium, said tunneling current being a read signal representing said data stored in said magnetic domains of magnetization.

2. Apparatus in accordance with claim 1, wherein the second electrode is part of the storage medium.

3. Apparatus in accordance with claim 1, wherein the second electrode is magnetically coupled to the storage medium.

4. Apparatus in accordance with claim 1, wherein the means for irradiating the second electrode comprises a laser diode.

5. Apparatus in accordance with claim 1, wherein the second electrode comprises an additional layer which reduces the work function of said second electrode.

6. Apparatus in accordance with claim 1, wherein at least one electrode forms at least part of a tip positionable in the proximity of a surface of the storage medium.

7. Apparatus in accordance with claim 1, wherein the irradiating means forms at least part of a tip positionable in the proximity of a surface of the storage medium.

8. Apparatus for retrieving data from a magnetic storage medium having magnetic domains of magnetization of two different orientations representing said data comprising a first electrode and a second electrode including a layer of magnetic material, said layer of magnetic material either being said magnetic storage medium or being magnetically coupled to said magnetic storage medium means for applying a voltage between said electrodes, means for detecting a tunneling current between said electrodes, and means for irradiating said second electrode with non-ionizing light radiation, said light radiation causing, in operation, tunneling current between said electrodes of a magnitude which depends on the magnetization orientation of individual magnetic domains of said storage medium, wherein the irradiating means, the first and the second electrode, together with a separating layer, form at least a part of a tip positionable in the proximity of a surface of the storage medium.

9. Apparatus for retrieving data from a magnetic storage medium having magnetic domains of magnetization of two different orientations representing said data, comprising a first electrode and a second electrode including a layer of magnetic material, said layer of magnetic material either being said magnetic storage medium or being magnetically coupled to said magnetic storage medium, means for applying a voltage between said electrodes, means for detecting a tunneling current between said electrodes, and means for irradiating said second electrode with non-ionizing light radiation, said light radiation causing, in operation, tunneling current between said electrodes of a magnitude which depends on the magnetization orientation of individual magnetic domains of said storage medium, wherein the first and the second electrode, together with a separating layer, form at least a part of the storage medium.

10. Apparatus in accordance with claim 9, wherein the means for irradiating the second electrode comprises an aperture having a diameter smaller than the wavelength of the electromagnetic radiation at the apex of a tip positionable in the proximity of a surface of said storage medium.

11. Apparatus for retrieving data from a magnetic storage medium having magnetic domains of magnetization of two different orientations representing said data, comprising a first electrode and a second electrode including a layer of magnetic material, said layer of magnetic material either being said magnetic storage medium or being magnetically coupled to said magnetic storage medium, means for applying a voltage between said electrodes, means for detecting a tunneling current between said electrodes, and means for irradiating said second electrode with non-ionizing light radiation, said light radiation causing, in operation, tunneling current between said electrodes of a magnitude which depends on the magnetization orientation of individual magnetic domains of said storage medium, wherein the first and the second electrode are separated by a semiconductor.

12. Method for reading stored data from a data storage medium having a magnetic layer with domains of different magnetization representing said stored data, comprising the steps of: irradiating either said magnetic layer or a second magnetic layer magnetically coupled to said magnetic layer with polarized non-ionizing light radiation to thereby induce a current between the irradiated magnetic layer and an electrode, said current being modulated by said domains of different magnetization, measuring said modulated current and using the modulation of said modulated current to determine the magnetization of said domains of different magnetization of said magnetic layer to read said stored data.

13. Method in accordance with claim 12, wherein the polarized electromagnetic radiation has a wavelength in a range from 400 nm to 2 µm.

14. Method in accordance with claim 12, wherein the polarized electromagnetic radiation essentially consists of circular polarized light.

* * * * *